US012602646B2

(12) United States Patent

Hu et al.

(10) Patent No.: US 12,602,646 B2
(45) Date of Patent: Apr. 14, 2026

(54) SYSTEMS AND METHODS FOR CONTROLLED DATA SHARING IN SUPPLY CHAINS

(71) Applicant: Walmart Apollo, LLC, Bentonville, AR (US)

(72) Inventors: Lingyun Hu, Brooklyn, NY (US); Anand Banik, Rogers, AR (US); Harika Addagada, Bentonville, AR (US); Coran J. Coley, Bentonville, AR (US); Zachary Bell, Rogers, AR (US); Pushparaj Parab, Bentonville, AR (US); Haritha Gunawardana, Piscataway, NJ (US); Weihong Ou, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 508 days.

(21) Appl. No.: 17/837,620

(22) Filed: Jun. 10, 2022

(65) Prior Publication Data

US 2023/0401526 A1 Dec. 14, 2023

(51) Int. Cl.
*G06Q 10/0835* (2023.01)
*G06Q 10/087* (2023.01)
(Continued)

(52) U.S. Cl.
CPC ....... *G06Q 10/0835* (2013.01); *G06Q 10/087* (2013.01); *G06Q 30/04* (2013.01); *H04L 9/50* (2022.05)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 8,560,461 B1 10/2013 Tian
2019/0080284 A1 3/2019 Kim
(Continued)

FOREIGN PATENT DOCUMENTS

CN 112035574 12/2020
WO 2021128733 7/2021
WO 2021231408 11/2021

OTHER PUBLICATIONS

Wan, Paul Kengfai, Lizhen Huang, and Halvor Holtskog. "Blockchain-enabled information sharing within a supply chain: A systematic literature review." IEEE access 8 (2020): 49645-49656. (Year: 2020).*

(Continued)

*Primary Examiner* — Emmett K. Walsh
(74) *Attorney, Agent, or Firm* — Fitch, Even, Tabin & Flannery LLP

(57) ABSTRACT

Methods and systems for controlled data sharing are provided. A method includes: communicating, as a first node of a supply chain distributed ledger, with a second node and a third node of the ledger, the nodes corresponding to a first entity, a second entity, and a third entity in a supply chain; storing, with a data management module, a hash of a public version of a contract between the first entity and the second entity; replicating the hash of the public version of the contract to the ledger; sharing a private version of the contract between the first and second nodes; storing a hash of a public version of a purchase order between the first entity and the third entity; replicating the hash of the public version of the purchase order to the ledger; and sharing a private version of the purchase order between the first and third nodes.

20 Claims, 12 Drawing Sheets

(51) Int. Cl.
G06Q 30/04      (2012.01)
H04L 9/00      (2022.01)

(56) References Cited

U.S. PATENT DOCUMENTS

2021/0157947 A1*   5/2021   Biazetti ................. H04L 9/3247
2021/0209546 A1   7/2021   Ramachandran
2023/0401525 A1   12/2023   Hu

OTHER PUBLICATIONS

Hussain, Muhammad Tariq; "How Blockchain Based Smart-Contracts Can Improve Invoicing Accuracy"; <https://www.researchgate.net/publication/344575012_HOW_BLOCKCHAIN_BASED_SMART-CONTRACTS_CAN_IMPROVE_INVOICING_ACCURACY>; Aug. 27, 2020; 65 pages.
Mearian, Lucas; "Walmart launches 'world's largest' blockchain-based freight-and-payment network"; <https://www.computerworld.com/article/3454336/walmart-launches-world-s-largest-blockchain-based-freight-and-payment-network.html>; Nov. 19, 2019; 6 pages.
Amazon; "Amazon Managed Blockchain Hyperledger Fabric Developer Guide"; <https://www.syncids.com/#/app/show=todo&term=154405&filterType=smart>: available at least as early as Mar. 11, 2022; 135 pages.
Hyperledger Fabric; "Private data"; <https://hyperledger-fabric.readthedocs.io/en/release-2.2/private-data/private-data.html>; Sep. 20, 2020; 13 pages; retrieved from Internet Archive Wayback Machine <http://web.archive.org/web/20200920043646/https://hyperledger-fabric.readthedocs.io/en/release-2.2/private-data/private-data.html> on Sep. 8, 2022.
USPTO; U.S. Appl. No. 17/837,322; Final Rejection mailed Mar. 12, 2024; (pp. 1-20).
USPTO; U.S. Appl. No. 17/837,322; Non-Final Rejection mailed Sep. 9, 2024; (pp. 1-17).
USPTO; U.S. Appl. No. 17/837,322; Non-Final Rejection mailed Nov. 2, 2023; (14 pages).
USPTO; U.S. Appl. No. 17/837,322; Final Rejection mailed Feb. 10, 2025; (pp. 1-18).

* cited by examiner

600

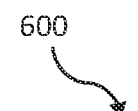

602 — Accessing a contract for transport of goods by a carrier

604 — Receiving shipment events data regarding transport by the carrier

606 — Calculating an adjustment to the price based on the shipment events data

608 — Calculating a second adjustment to price based on volume of the purchaser's goods 610 — Generating an invoice for transport of the goods 612 — Receiving approval from the purchaser and the carrier to adjustments shown in the invoice 614 — Adding the invoice to a supply chain distributed ledger

*FIG. 6*

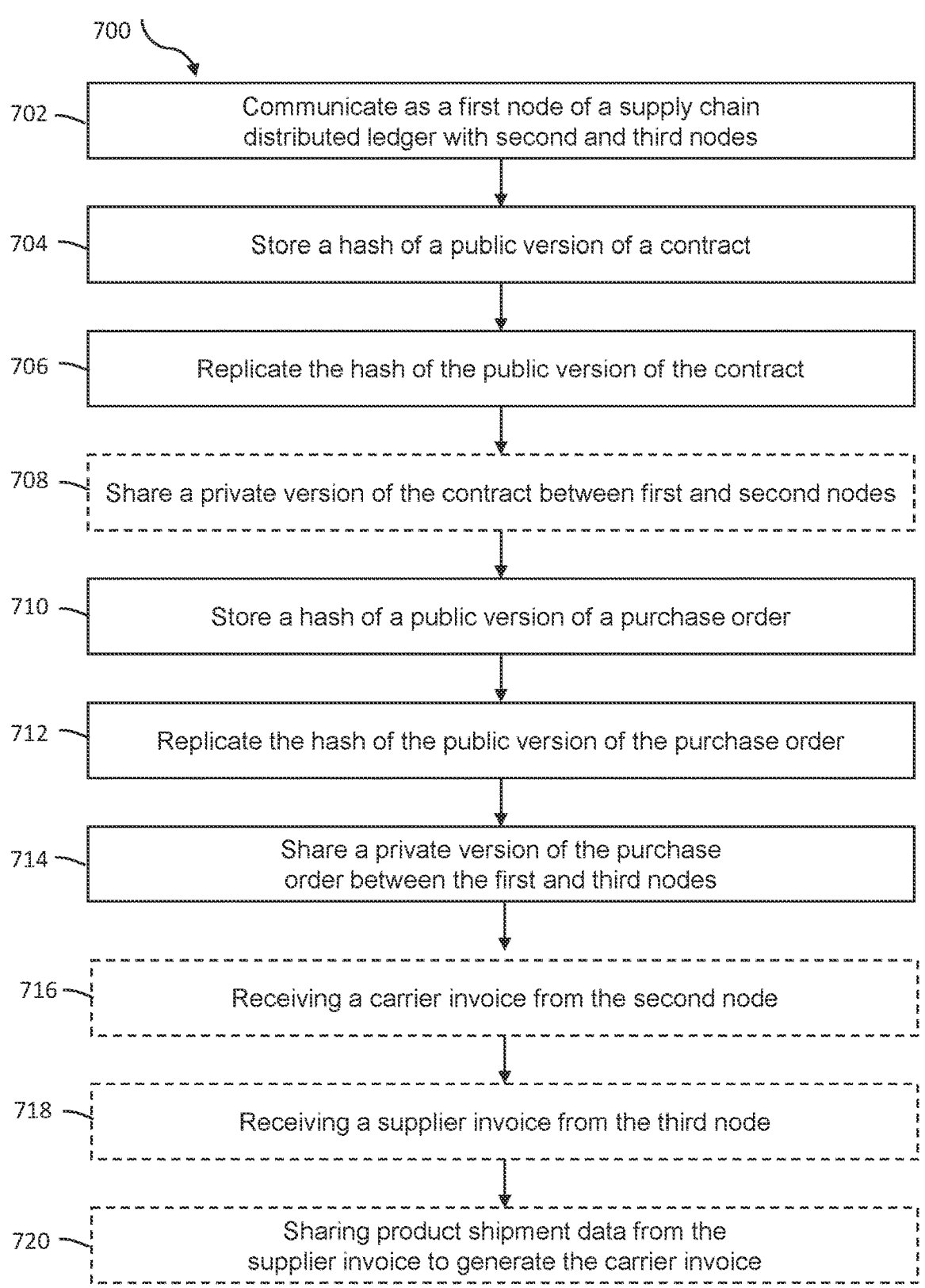

700

702 — Communicate as a first node of a supply chain distributed ledger with second and third nodes 704 — Store a hash of a public version of a contract 706 — Replicate the hash of the public version of the contract 708 — Share a private version of the contract between first and second nodes 710 — Store a hash of a public version of a purchase order 712 — Replicate the hash of the public version of the purchase order 714 — Share a private version of the purchase order between the first and third nodes 716 — Receiving a carrier invoice from the second node 718 — Receiving a supplier invoice from the third node 720 — Sharing product shipment data from the supplier invoice to generate the carrier invoice

SYSTEMS AND METHODS FOR CONTROLLED DATA SHARING IN SUPPLY CHAINS

TECHNICAL FIELD

This invention relates generally to controlled data sharing in supply chains, and more particularly, to controlled data sharing involving a distributed ledger.

BACKGROUND

There is a lack of automated visibility for asset tracking of transported and shipped goods for logistics, payment claims, and surety of supply. Transport of goods often involves a purchaser of goods, a supplier of the goods, and/or a carrier of the goods, and during transport, shipment events may occur that result in a change in expected transportation charges or in additional, unexpected transportation charges. It is desirable for the purchaser, the supplier, and/or the carrier to be able to track supply chain events and physical assets across a distributed ledger. There is a need for the storage of associated data as hashed values on a blockchain to prevent disputes and to enable automation of invoice calculation across network participants. In addition, in some forms, there may be a need for controlled data sharing such that certain sensitive data is not shared with certain participants.

BRIEF DESCRIPTION OF THE DRAWINGS

Disclosed herein are embodiments of systems and methods for providing automatic invoice adjustment. This description includes drawings, wherein:

FIG. 6 comprises a flow diagram in accordance with some embodiments;

FIG. 7 comprises a flow diagram in accordance with some embodiments;

FIG. 13 comprises a system diagram configured in accordance with some embodiments.

Figure 1:
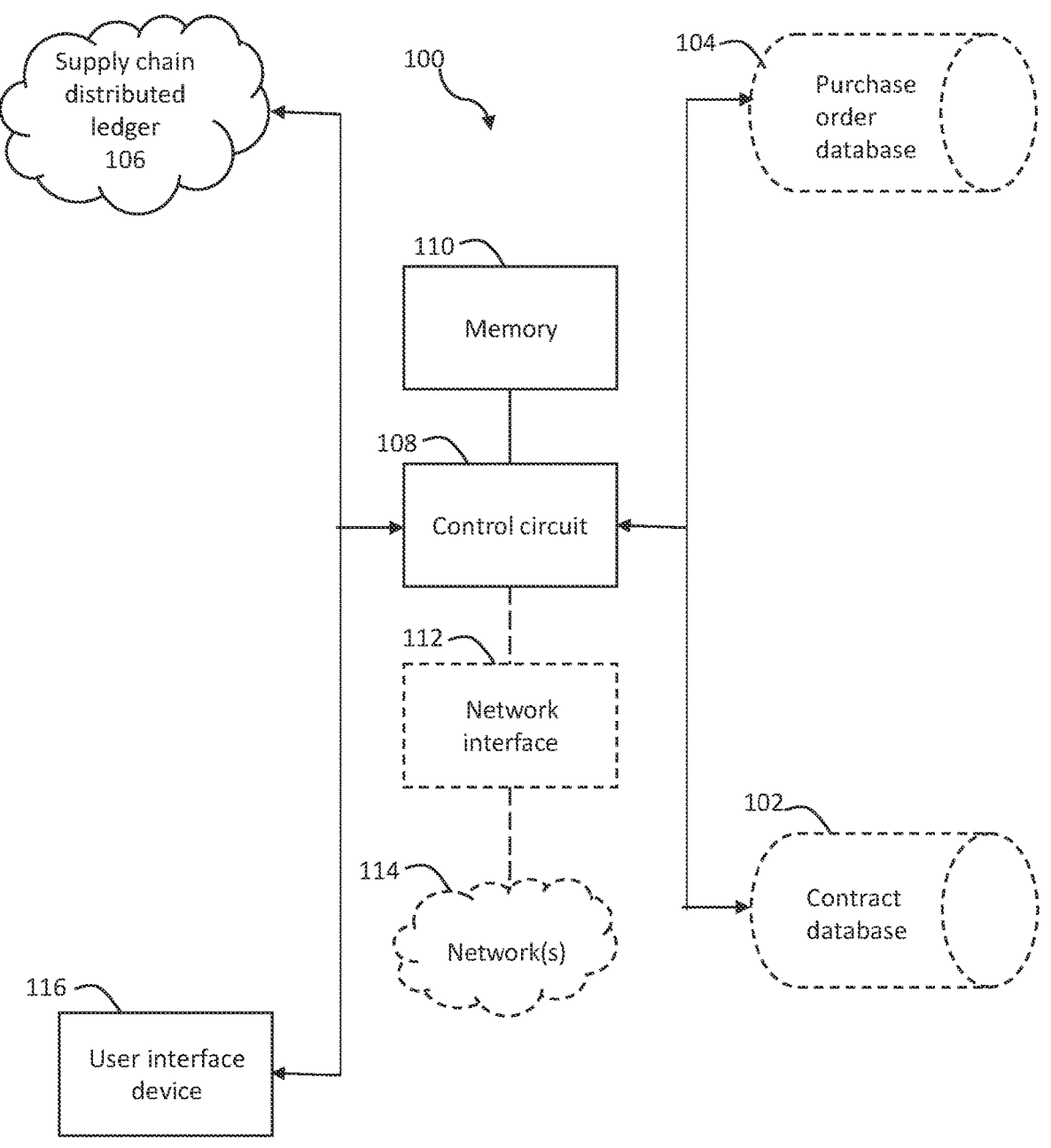
FIG. 1 comprises a block diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for use in generating adjustments to invoices. In one form, the system includes: a network interface; a user interface device; and a control circuit coupled to the network interface and the user interface device. In this form, the control circuit executing a data management module is configured to: communicate, as a first node of a supply chain distributed ledger and via the network interface, with a second node and a third node of the supply chain distributed ledger, the nodes corresponding to a first entity, a second entity, and a third entity in a supply chain; store a hash of a public version of a contract between the first entity and the second entity at the first node; replicate the hash of the public version of the contract to the supply chain distributed ledger, the public version of the contract being accessible to all of the entities; share a private version of the contract between the first and second nodes, the private version of the contract being shared peer-to-peer between, and accessible by, only the first and second entities; store a hash of a public version of a purchase order between the first entity and the third entity at the first node; replicate the hash of the public version of the purchase order to the supply chain distributed ledger, the public version of the contract being accessible to all of the entities; and share a private version of the purchase order between the first and third nodes, the private version of the contract being shared peer-to-peer, and accessible by, only the first and third entities.

In some implementations, in the system, the first entity is a purchaser of products, the second entity is a carrier of the products, and third entity is a supplier of the products. In some implementations, the public version of the contract includes information indicating existence of the contract but not actual contract terms. In some implementations, the public version of the contract does not include at least one of origin, destination, container type, carrier identification data, or carrier rate data. In some implementations, the public version of the purchase order includes at least one of product identifier, product name, and product quantity. In some implementations, the public version of the purchase order does not include item price data. In some implementations, the control circuit executing the data management module is configured to: receive, as the first node of the supply chain distributed ledger and via the network interface, a carrier invoice from the second node, the carrier invoice being shared peer-to-peer between, and accessible by, only the first and second entities. In some implementations, the control circuit executing the data management module is configured to: receive, as the first node of the supply chain distributed ledger and via the network interface, a supplier invoice from the third node, the supplier invoice being shared peer-to-peer between, and accessible by, only the first and third entities. In some implementations, the control circuit executing the data management module is configured to: share product shipment data from a supplier invoice of the third entity with the second entity to generate a carrier invoice. In some implementations, the control circuit executing the data management module is configured to: maintain data integrity and share data with a fourth entity being a regulatory agency, the data being shared peer-to-peer, and accessible by, only the first and fourth entities.

In another form, there is provided a method for controlled data sharing comprising: communicating, as a first node of a supply chain distributed ledger and via a network interface, with a second node and a third node of the supply chain distributed ledger, the nodes corresponding to a first entity, a second entity, and a third entity in a supply chain; storing, with a control circuit executing a data management module, a hash of a public version of a contract between the first entity and the second entity at the first node; replicating, by the control circuit, the hash of the public version of the contract to the supply chain distributed ledger, the public version of the contract being accessible to all of the entities; sharing, by the control circuit, a private version of the contract between the first and second nodes, the private version of the contract being shared peer-to-peer between, and accessible by, only the first and second entities; storing, by the control circuit, a hash of a public version of a purchase order between the first entity and the third entity at the first node; replicating, by the control circuit, the hash of the public version of the purchase order to the supply chain distributed ledger, the public version of the contract being accessible to all of the entities; and sharing, by the control circuit, a private version of the purchase order between the first and third nodes, the private version of the contract being shared peer-to-peer, and accessible by, only the first and third entities.

As an overview, without limitation, this disclosure is directed generally to using a distributed ledger and blockchain in the context of goods purchased from a supplier and shipped by a carrier. A blockchain is a digital record of a transaction that is distributed (records are shared with network participants) and secured using cryptographic technologies. Transaction events may be captured in-real-time and broadcast to blockchain network entities. The transaction data may be stored as a copy by each participant. This allows every node on the network to have real-time shared visibility to all transaction events and enables data integrity where it is challenging for one organization to gain control and change historical data on the network, thereby eliminating disputes. A blockchain is managed by each company's software, or node, on a peer-to-peer basis without the need for the intermediaries who traditionally authenticate transactions (such as banks or customs brokers).

The blockchain may use self-executing smart contracts that automate business workflows and enable real-time contract execution based on specified triggering events and conditions and helps eliminate disputes and foster reconciliation. These smart contracts are programs stored on the blockchain that are automatically executed when certain conditions are met. In this manner, participants can be certain of the outcome when these conditions arise without requiring the involvement of an intermediately and without the loss of any time.

In one aspect, this disclosure is also directed generally to using a distributed ledger to automate the adjustment of invoices based on shipping events. The system may utilize digital events transportation data to identify event triggers of start and end date milestones and to ingest automated digital contract rates data. Further, it may include the ability to issue variable charge invoice using digital events transportation data to identify event triggers exceeding contract rates. The system may automate carrier invoice generation, add the invoice to the blockchain, and broadcast it to all network's carrier channel participants to enable transparency and minimize disputes, including, for example, an audit trial of contract and price and quantity changes.

In one aspect, this disclosure is also directed generally to calculating and issuing transportation charges in near real-time using digital contract rates and shipment events data, including split container charges using container volume. The system may make adjustments at a container level (where the goods of multiple purchase orders are in one container) and at a purchase order level (where the goods of a single purchase order may be included in multiple containers). As used in this disclosure, it should be understood that the goods being transported may be transported in containers or may be otherwise transported in loads with or without containers. For example, if the goods are being transported by ground transportation, the goods may be transported in loads that are deposited on rail cars or trucks, such as on pallets.

Further, it may include the ability to track and issue variable charges using digital events transportation data to identify event triggers exceeding contractual rates for detention and demurrage charges. In addition, it may include the ability to add automated carrier invoice to the blockchain using private data collection to enable visibility of charge to destinated carrier to minimize disputes and claims. In addition, the system may allow the submission of images for real-time claims filing of damaged products.

In one aspect, this disclosure is also directed generally to enabling the visibility of certain sensitive data (such as, for example, price of the goods) to permissioned network participants. It is generally contemplated that the network may include, at least, three participants: a purchaser of the goods, a supplier of the goods, and a carrier of the goods. In this context, it may be desirable to only permission the purchaser and the supplier to see the price and any adjustments to the price. Further, for example other types of information may be shared only between the purchaser and the supplier.

Referring to FIG. 1, there is shown a block diagram showing a system 100 for generating adjustments to invoices using a distributed ledger. It is generally contemplated that the distributed ledger generally includes nodes for a purchaser of goods and for a carrier of goods. In one form, the invoice corresponds to transport/shipment events that result in changes in transportation charges, such as, for example, transportation charges that may exceed a contractual amount. In some forms, it is also generally contemplated that the distributed ledger includes a node corresponding to a supplier of the goods.

The system 100 may include a contract database 102 that includes a contract of the purchaser that involves the carrier.

In other words, the purchaser has contracted with a carrier (or transportation company) to transport/ship the goods. In one form, the purchaser may be a retailer of merchandise. It is generally contemplated that the carrier contract may include various terms and information relating to the transport/shipment, such as, for example, origin of the shipment, destination, container type, a standard carrier alpha code (SCAC) used to identify the carrier, base rate/price, etc.

The system 100 may also include a purchase order database 104 that includes a purchaser order between the purchaser and the supplier. In other words, the purchaser has placed a purchase order with a supplier for the purchase of the supplier's goods. It is generally contemplated that the purchase order may include various terms and information relating to the purchase, such as, for example, product name, product quantity, product price, product identifier, etc. It should also be understood that these contract and purchase order databases 102 and 104 may be part of a single, unitary database or may be part of more comprehensive databases.

The system includes a supply chain distributed ledger 106. The supply chain distributed ledger 106 comprises a distributed database comprising a plurality of nodes. In some form, the supply chain distributed ledger 106 comprises a plurality of records relating to one or more transactions involving the purchaser, the carrier, and/or the supplier, such as, for example, purchase order(s), carrier contract(s), and invoice(s). It may also be more comprehensive and involve additional entities. For example, in some forms, the supply chain distributed ledger 106 comprises a plurality of transaction records recording transfers of physical items and/or services between two or more entities of a supply chain (e.g., farm, supplier, manufacturer, transportation service provider, whole seller, retailer, etc.). In some embodiments, a transaction record may include an entities identifier (e.g., farm region, processor name and location, supplier name and location, distribution identifier, and store identifier), a transfer date, a transfer location, and characteristics of the transferred product or service (e.g., origin, ingredients). In some embodiments, the transaction record may include references to one or more other transaction records, recording, for example, a prior transfer of the product.

In some forms, the supply chain distributed ledger 106 may comprise a cryptographically verifiable ledger managed by a peer-to-peer network. In some forms, the supply chain distributed ledger 106 may comprise a blockchain database collectively verified and updated by computer systems associated with any number of entities in the supply chain functioning as nodes of the blockchain. For example, the blockchain may be updated and/or verified by retail stores, transporters, warehouses, distribution centers, suppliers, processors, manufacturers, farms, etc. In some embodiments, entities of the supply chain may add transaction records to the blockchain as triggered by supply chain events associated with the entity and sign the update with its cryptographically verifiable signature. In some embodiments, the updates of the supply chain events may be automatically triggered at one or more computer systems by fulfillment of conditions in a smart contract and/or based on departure or arrival scans of products by a scanning device such as a camera, an optical code (e.g., barcode, QR code) reader, a radio frequency identification tag reader, etc. Other entities may collectively verify the update requests before each update becomes a permanent part of the blockchain record. Further details of a blockchain that may be used with the systems and methods described herein are described with reference to FIGS. 8-13.

The system 100 includes a control circuit 108 that is configured to execute an invoice adjustment module and to perform certain operations. In this context, the term control circuit 108 refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

As shown in FIG. 1, the control circuit 108 is coupled to a memory 110 and to a network interface 112 and wireless network(s) 114. The memory 110 can, for example, store non-transitorily computer instructions that cause the control circuit 108 to operate as described herein, when the instructions are executed, as is well known in the art. Further, the network interface 112 may enable the control circuit 108 to communicate with other elements (both internal and external to the system 100). This network interface 112 is well understood in the art. The network interface 112 can communicatively couple the control circuit 108 to the wireless network 114 and whatever other networks 114 may be appropriate for the circumstances. The control circuit 108 may make use of cloud databases and/or operate in conjunction with a cloud computing platform. As can be seen, the control circuit 108 may be coupled to one or more databases (such as contract database 102 and purchase order database 104).

While one control circuit 108 is shown, in some forms, the functionalities of the control circuit 108 may be implemented on a plurality of processor devices communicating on a network 114. In some forms, the control circuit 108 may be coupled to a plurality of interface devices 116 and simultaneously respond to any number of queries from one or more user interface devices 116.

The control circuit 108 accesses the contents of a contract of a purchaser for the transport of goods by a carrier (or transportation provider). The contract corresponds to at least one container used to transport the goods that are the subject of the contract, and the contract includes at least one transportation charge relating to transport of the goods and a price for transport of the goods. It is generally contemplated that the contract may provide for certain possible or anticipated shipment events and transportation charges. The control circuit 108 may access the contract via the contract database 102 and/or via a node of the supply chain distributed ledger 106.

The control circuit 108 receives shipment events data regarding transport of the goods by the carrier. The shipment events data results in a change in a transportation charge or results in an additional transportation charge. For example, the transportation charge may exceed an amount permitted under the contract or not covered by the contract. The control circuit 108 calculates an adjustment to the price (or invoice amount) based on the shipment events data.

The shipment events may any of various types that may result in transportation charges. For example, the shipment events data may be detention and/or demurrage, resulting in detention charges and/or demurrage charges, and the control circuit 108 executing the invoice adjustment module calculates the adjustment to the price based on additional transportation charges resulting from detention charges and/or demurrage charges. Detention and demurrage are generally related concepts. Demurrage may be charged per day per container until a full container is moved out of a port or terminal for unpacking within an allotted time. Detention may be charged per day per container after the container has been picked up for unpacking but the empty container has not been returned to a designated location within an allotted time. In one form, the control circuit executing the invoice adjustment module may: detect issuance of detention charges and/or demurrage charges relating to the purchaser's goods; determine that the detention charges and/or demurral charges exceed a contractual rate; and calculate the adjustment to the price based on the detention charges or demurral charges exceeding the contractual rate.

Another example of a shipment event that may result in additional charges is damage to the goods. The shipment events data may involve inspection of the purchaser's goods or insurance claims from damage to the purchaser's goods. In this context, it is also contemplated that the control circuit 108 executing the invoice adjustment module may receive one or more images showing a condition of the purchaser's goods and may add the one or more images to the supply chain distributed ledger 106. In this manner, the images may be visible to all relevant parties (purchaser, carrier, and/or supplier) such that all parties can understand and determine the extent of any damage and claims arising from such damage.

It should be understood that this disclosure contemplates that the shipment/transport of goods may be made in any of various ways, including ship transport, ground transport, air transport, etc. For example, shipment/transport may be conducted by an ocean carrier transporting goods internationally between countries, by rail domestically within the United States, or by aircraft flying between countries or flying domestically. In some circumstances, the shipment/transport of goods from an origin to a destination may involve some combination of ship, ground, and/or air transport. Thus, a "carrier" may be any of ship, ground, or air carriers, and the phrase "shipment event" generally includes events that may occur during ship, ground, or air transport. An example of a "shipment event" that may apply to ground transport and that may result in additional charges is a fuel surcharge.

The control circuit 108 generates an invoice for transport of the goods, the invoice including the adjusted calculation to the price. It adds the invoice to the supply chain distributed ledger 106 via the network interface 112. As indicated above, the supply chain distributed ledger 106 comprises a plurality of nodes with at least one node corresponding to the purchaser and at least one node corresponding to the carrier such that the invoice is accessible on the supply chain distributed ledger 106 to the purchaser and to the carrier.

In one form, it is generally contemplated that the adjustments may be made at a container level or at a purchase order level (and/or adjustments may be displayed on a user interface at a container level or purchase order level). For example, the purchaser's goods that are the subject of the contract (and/or that are the subject of multiples purchase orders with supplier(s)) are transported in a single container. In one form, the control circuit 108 executing the invoice adjustment module may calculate a cost split based on the volume of the purchaser's goods occupying the container corresponding to each purchase order.

In another example, the purchaser's goods that are the subject of the contract (and/or that are the subject of a purchase order with a supplier) are transported in a plurality of containers. In one form, the control circuit 108 executing the invoice adjustment module calculates a cost split based on the volume of the purchaser's goods in the plurality of containers corresponding to the purchase order.

Further, the display on the user interface device 116 may be grouped by purchaser order or by container. In one form, a purchaser order may cover several containers, and it may be desirable to group by purchase order and view the purchase order aggregated cost. In some forms, charges may be assigned to each container. Container charges may be split based on container volume (in cubic meters or CBM) with containers of different sizes being assigned different charges (and possibly invoiced separately by container). In another form, some containers may contain multiple different types of items/purchase orders, and it may be desirable to group by container and view the container split cost. For example, one container may contain a certain amount of bananas and a certain amount of oranges combined in the container. In one form, these different items may be tracked and invoiced separately. It is generally contemplated that both levels of dashboard views would be available to any authorized party. Automated purchase order level and container level split cost calculations may use digital contract rates to minimize reconciliation and disputes.

Further, in some forms, it is contemplated that the control circuit 108 may make adjustments based on provisions of the contract or based on data stored in the supply chain distributed ledger 106. For example, the adjustment may be calculated based on predetermined digital transportation contract rates stored in the supply chain distributed ledger 106. Similarly, the control circuit 108 executing the invoice adjustment module may calculate the adjustment to the price according to rules of a smart contract recorded in the supply chain distributed ledger 106. Additionally, it is contemplated that adjustments may require the approval of both the purchaser and the carrier. In other words, the control circuit 108 executing the invoice adjustment module may receive approval of the invoice from one or both of the purchaser or the carrier prior to recording it on the supply chain distributed ledger.

Figure 2:
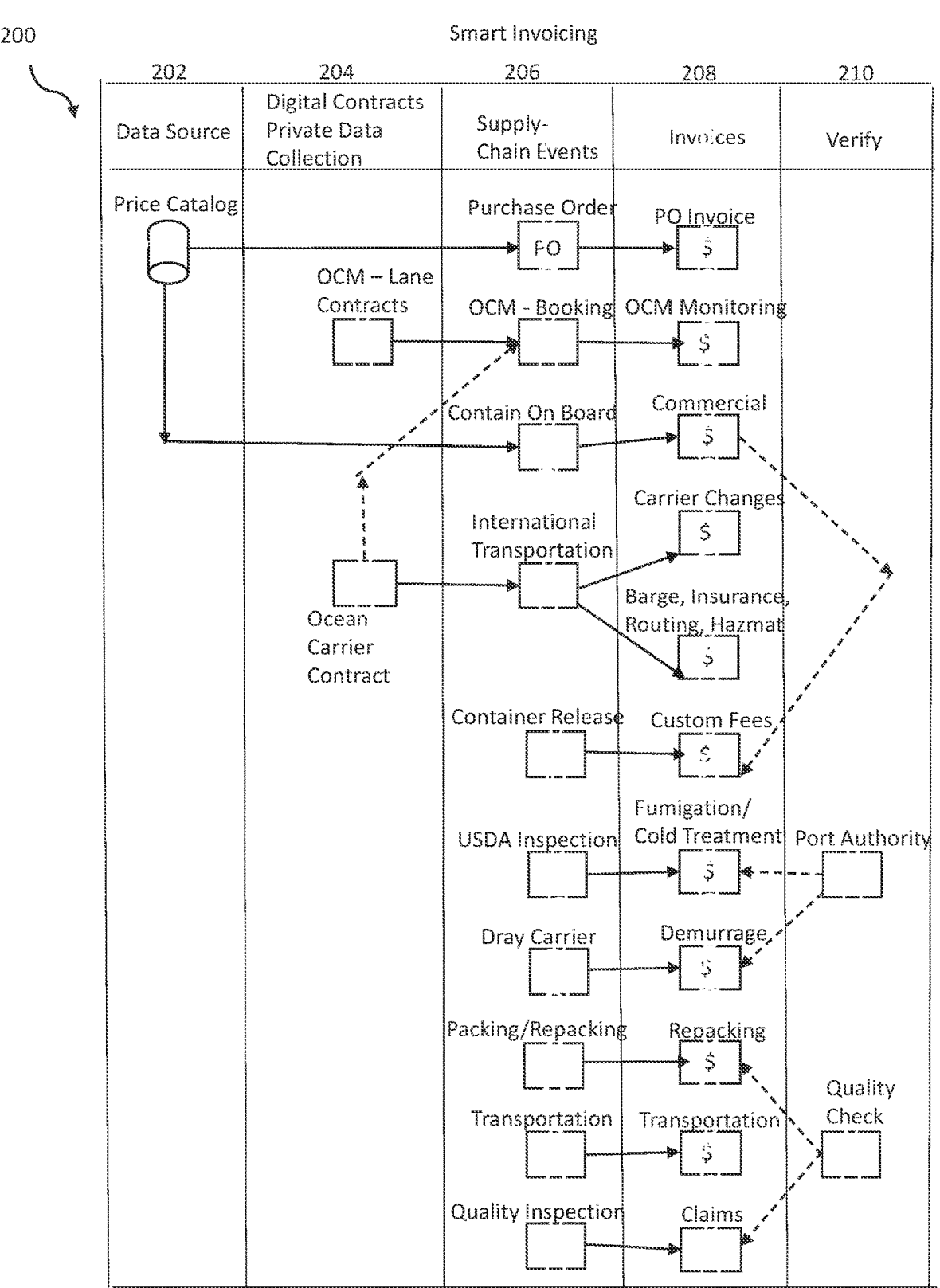
FIG. 2 comprises a schematic diagram in accordance with some embodiments.

FIG. 2 shows a more complicated arrangement 200 of supply chain events (and examples of supply chain events). FIG. 2 shows the purchaser's data sources 202, the digital contracts and private data collection 204 that are involved, a list of various supply chain events 206, the invoices 208 that result from the different supply chain events, and verification actions 210 that also impact the invoices 208. As examples of various scenarios, there may be four different containers that are the subject of a purchaser order that undergo various supply chain events (shipment events) 206. The example involves a first container in ship 1 that is contaminated. The container requires a USDA inspection hold, cold treatment, and re-inspection at the port, and it triggers invoice(s) with multiple inspection costs. The example may involve a second container in ship 2. Ship 2 experiences a storm, the second container goes over-board, and this occurrence triggers an insurance claim. The example may also involve a third container in ship 3. Ship 3 and the container may be delayed, which may trigger detention/demurrage charges to the carrier. The example may further involve a fourth container in ship 4. The ship and container may experience no delays, which may trigger a reward for the carrier. These invoices (and adjustments) are recorded on the supply chain distributed ledger.

Figure 3:
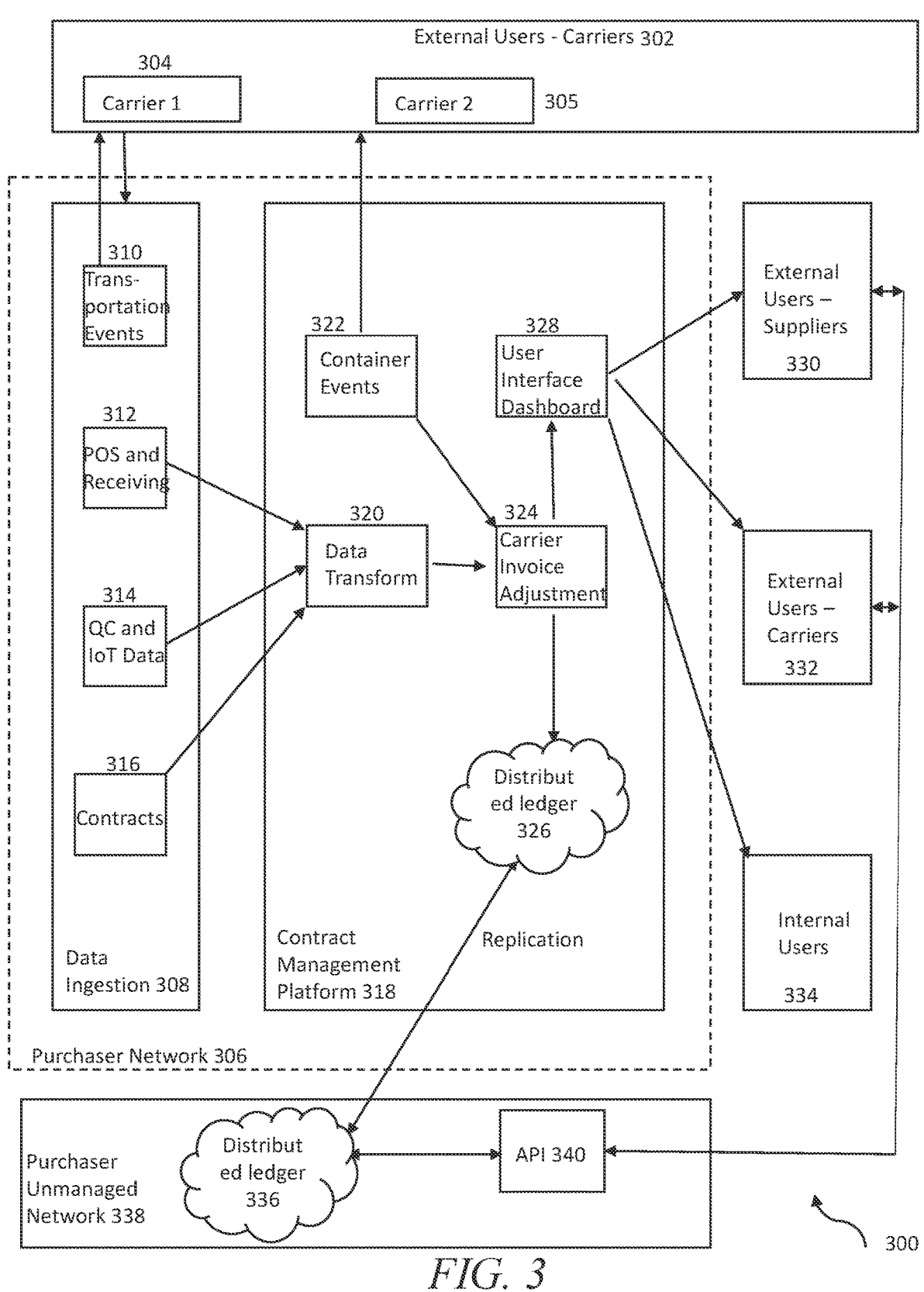
FIG. 3 comprises a schematic diagram in accordance with some embodiments.

Referring to FIG. 3, there is shown a schematic diagram of an exemplary architecture and workflow of a system 300.

FIG. 3 shows carrier network(s) 302 that may include one or more carriers, such as, for example Carrier 1 (304) and Carrier 2 (305). The carrier network(s) are in communication with the purchaser's network 306. The purchaser's network 306 includes a data ingestion module 308, which receives and/or stores data relating to, for example, transportation events 310, purchaser orders and receiving 312, quality control and Internet of Things data 314, and contracts 316 (including carrier contracts). Data from the data ingestion module 308 is received and transformed in the contract management platform 318 at a data transformation block 320. This data (along with container events data 322) are utilized at the carrier invoice adjustment block 324. Container charges may be split using container volume data (cubic meters or CBM), and various charges may be calculated, such as, for example, detention and demurrage charges.

An invoice is transferred to the distributed ledger 326, and private data collection may be used (as addressed further below) so that sensitive information is displayed only to the carrier (and not to the supplier). Information may be communicated via user interface dashboard 328 to suppliers 330, carriers 332, and internal users 334. The distributed ledger 326 may be replicated to a distributed ledger 336 at an unmanaged network 338. The suppliers 330 and carriers 332 may read and write data to the distributed ledger 336 via an application programming interface (API) server 340. It is generally contemplated that web traffic will be allowed/authenticated from the supplier and carrier networks 330 and 332 through a firewall. Further, in one form, it is contemplated that authorization is done using a public key, and access to the distributed ledger 336 is only through the API server 340. It is also contemplated that any of various types of distributed ledger software may be used, such as, for example, distributed ledger software and platforms using Hyperledger Fabric.

Figure 4:
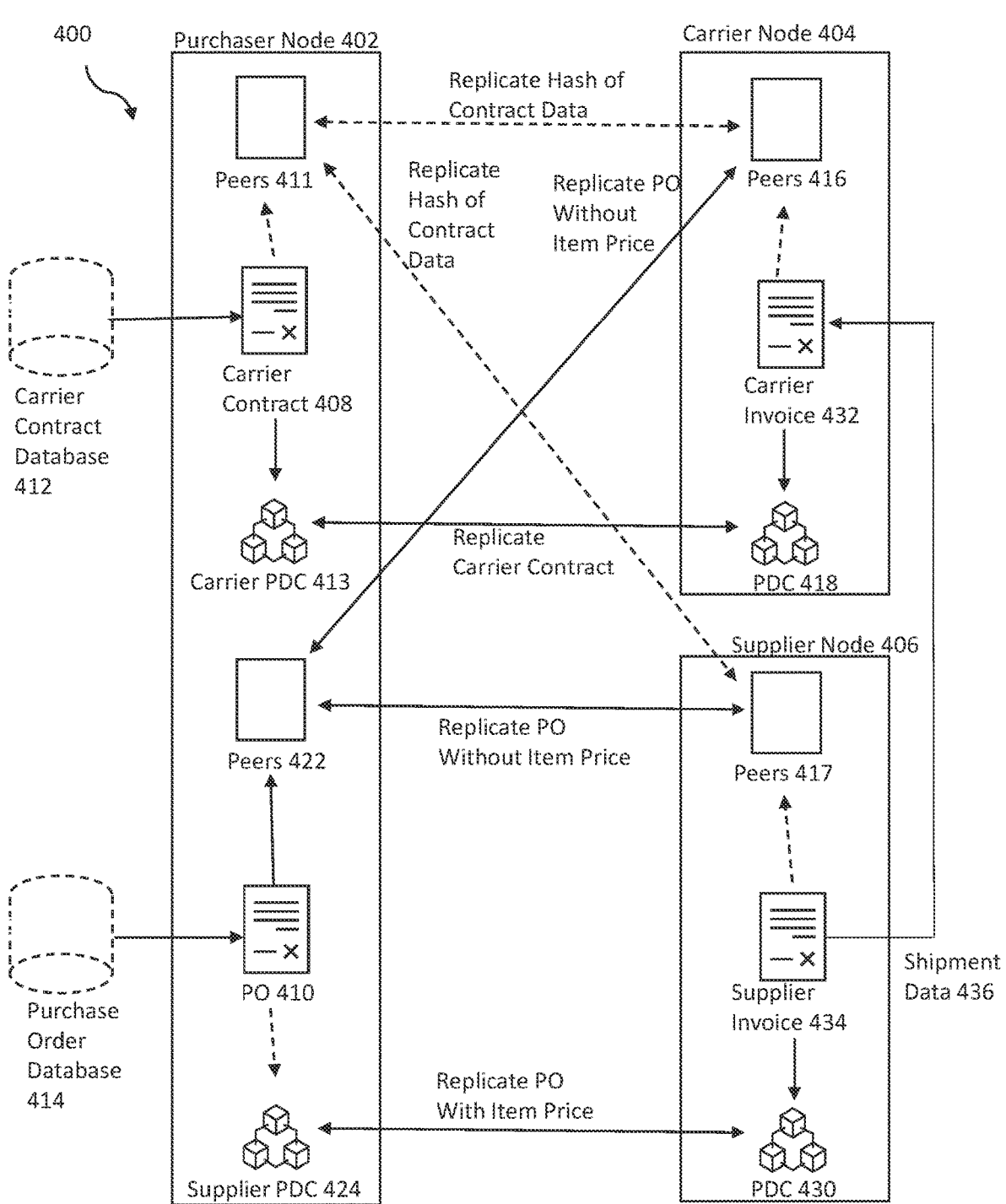
FIG. 4 comprises a flow diagram in accordance with some embodiments.

Referring to FIG. 4, there is shown a supply chain distributed ledger 400. In some forms, this distributed ledger corresponds to the distributed ledgers 114/326/336, and the above description is incorporated herein. This supply chain distributed ledger 400 allows for controlled data sharing between the network participants. It is generally intended to allow the sharing of certain non-sensitive data with all participants but to limit the sharing of certain data to certain participants. In one form, this sharing of sensitive and non-sensitive data is between a purchaser of goods, a carrier of the goods, and a supplier of the goods. The description below makes use of the control circuit 108 of FIG. 1 executing a data management module, as well as the other general components shown in FIG. 1.

In one aspect, the supply chain distributed ledger 400 may utilize a controlled data sharing feature, such as, for example, private data collection (PDC), to store and replicate data across authorized nodes. This data can only be accessed by authorized peers. A hash of the data, which is endorsed, ordered, and written to the ledgers of every peer on the channel. The hash serves as evidence of the transaction and is used for validation and can be used for audit purposes. Further, this approach provides the ability to enable transactions to be shared among all network organization participants (i.e., a purchase order was delivered). However, only a subset of those organizations has access to some (or all) of the data within a transaction (i.e., the price of the purchase order may be shared between the purchaser and supplier but not with the carrier).

The supply chain distributed ledger 400 includes a purchaser node 402, a carrier node 404, and a supplier node 406.

The control circuit 108 communicates, as a first node (purchaser node 402) of the supply chain distributed ledger 400 and via the network interface 112, with a second node (carrier node 404) and a third node (supplier node 406) of the supply chain distributed ledger 400, the nodes corresponding to a first entity (purchaser), a second entity (carrier), and a third entity (supplier) in the supply chain. A carrier contract 408 and a purchase order 410 are recorded at the purchaser node 402 of the distributed ledger 400. In one form, these materials may be stored in a carrier contract database 412 and a purchase order database 414 (which may correspond generally to contract database 102 and purchase order database 104). However, in other forms, is contemplated that the carrier contract 408 and purchase order 410 may be initially recorded at the purchase's node 402.

At the purchaser node 402, the carrier contract 408 is recorded as two versions: a public version for peer-to-peer sharing with all three entities/peers 411 and a non-public version (carrier PDC 413) for sharing only between the purchaser and the carrier. In this context, the term "public" simply refers to the availability of data to all peers (and not the availability of the data to members of the public generally). The control circuit 108 stores a hash of the public version of the contract between the first entity and the second entity at the first node 402 and replicates the hash of the public version of the contract to the supply chain distributed ledger 400 such that the public version of the contract is accessible to all of the entities/peers 411, 416, 417. The control circuit 108 shares the private version of the contract between the first and second nodes such that the private version of the contract is shared peer-to-peer between, and accessible by, only the first and second entities. As can be seen, in this form, the carrier contract 408 is replicated at the carrier/second node at PDC 418. Thus, the data may be stored in a private database on the peer nodes of authorized organizations (purchaser and carrier). As one example, it is contemplated that this replication of sensitive transactional data may be conducted using the private data collection (PDC) feature of Hyperledger Fabric software/platform.

In one form, it is contemplated that only a hash of the carrier contract 408 shared with the network. This sharing may indicate the existence of the contract but not the actual data/contract terms. In some forms, it is contemplated that a few, limited terms may be shared with all peers/entities. Most (or all) of the terms will only be shared between the first entity purchaser and the second entity carrier. For example, the following details might be shared only between the purchaser and the carrier: origin, destination, container type, carrier identification data, and carrier rate data. In other words, the public version of the contract would not include one or more of origin, destination, container type, carrier identification data, or carrier rate data (and likely would include none of this information).

Also, at the purchaser node 402, the purchase order 410 is recorded as two versions: a public version for peer-to-peer sharing with all three entities/peers 422 and a non-public version (supplier PDC 424) for sharing only between the purchaser and the supplier. The control circuit 108 stores a hash of the public version of the purchase order between the first entity and the third entity at the first node 402 and replicates the hash of the public version of the purchase order to the supply chain distributed ledger 400 such that the public version of the purchase order is accessible to all of the entities/peers 422, 416, 417. The control circuit 108 shares the private version of the purchase order between the first and third nodes such that the private version of the purchase order is shared peer-to-peer between, and accessible by, only the first and third entities. As can be seen, in this form, the purchase order 410 is replicated at the supplier/third node at PDC 430.

In one form, it is contemplated that only a hash of the purchase order 410 shared with the network. In some forms, it is contemplated that a few, limited terms may be shared with all peers/entities. All of the terms will only be shared between the first entity purchaser and the second entity carrier. For example, the following details might be shared with all peers/entities: product name, product quantity, and product identifier. In other words, the public version of the purchase order might include at least one of product identifier, product name, and product quantity (and might include all of them). However, product price is an example of a contract term/data that might only be shared between the purchaser and the supplier. In other words, the public version of the contract would not include item price data.

Similarly, it is contemplated that certain sensitive information may be shared by the supplier and by the carrier to the purchaser. In one form, the control circuit 108 receives, as the first node 402 of the supply chain distributed ledger 400 and via the network interface 112, a carrier invoice 432 from the second node 404, the carrier invoice 432 being shared peer-to-peer between, and accessible by, only the first and second entities. Also, in one form, the control circuit 108 receives, as the first node 402 of the supply chain distributed ledger 400 and via the network interface 112, a supplier invoice 434 from the third node 406 with the supplier invoice 434 being shared peer-to-peer between, and accessible by, only the first and third entities.

However, it is contemplated that certain invoice data might be shared between the supplier and the carrier. More specifically, in one form, the control circuit 108 shares product shipment data 436 from the supplier invoice 434 of the third entity with the second entity to generate the carrier invoice 432. In other words, it is contemplated that certain data from one or both of these invoices may be useful or desirable in generating the other invoice.

In addition, it is also contemplated that certain, limited data may be shared with additional entities. For example, in one form, the control circuit 108 maintains data integrity and shares data with a fourth entity that is a governmental a regulatory agency, such as the U.S. Food and Drug Administration (FDA). This data is shared peer-to-peer, and accessible by, only the first and fourth entities. In certain circumstances involving the shipment/transport of goods, certain data must be provided to additional entities, such as, for example, may conduct inspections or some sort of verification, and it is desirable to use a distributed ledger to provide assurances of trustworthiness of the data.

Figure 5:
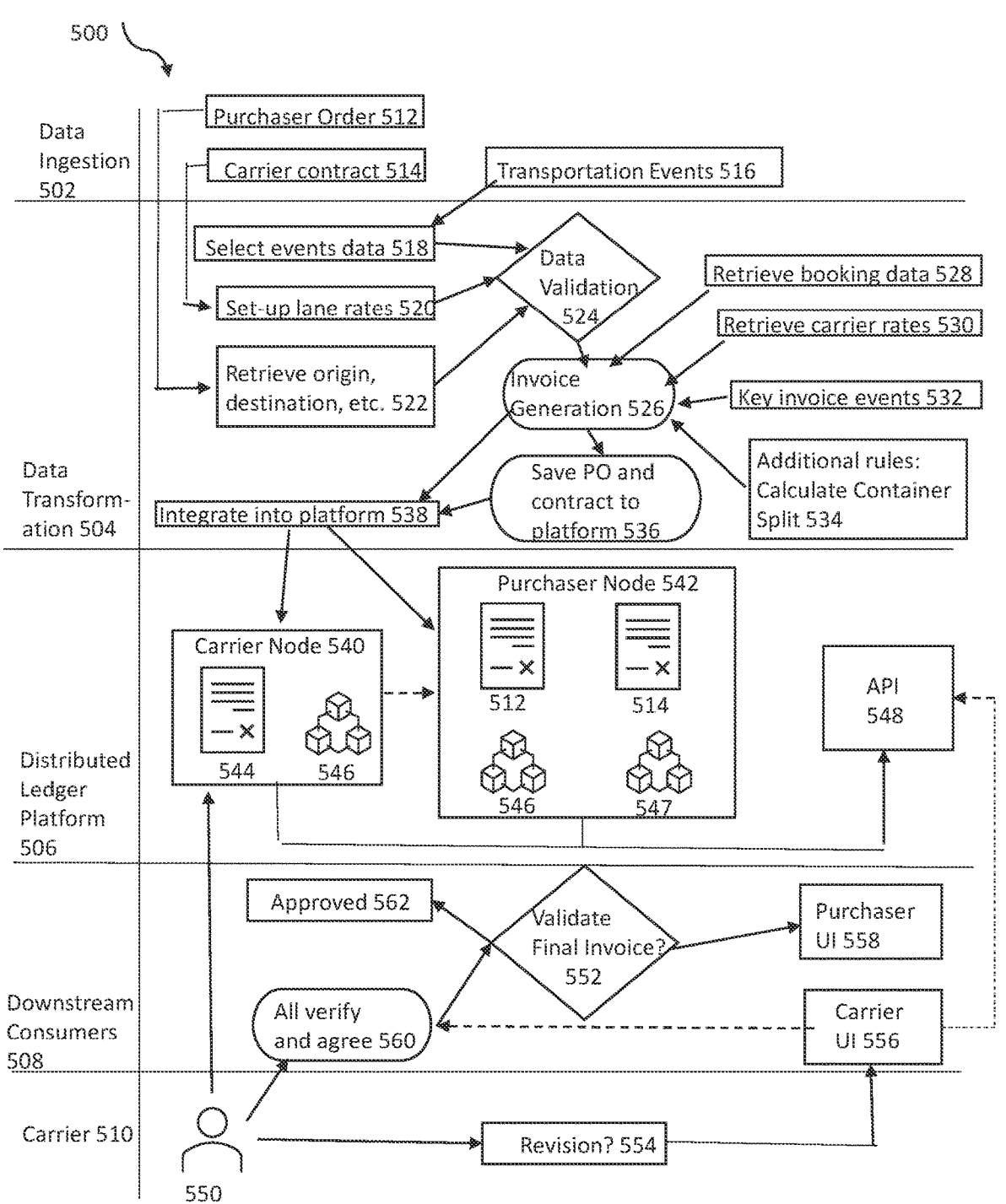
FIG. 5 comprises a flow diagram in accordance with some embodiments.

Referring to FIG. 5, there is shown a workflow or process 500 for generating an invoice with adjustments involving transport of goods by a carrier. The process 500 shows operations and interrelationships at various stages and involving various entities, including data ingestion 502, data transformation 504, distributed ledger platform 506, downstream consumers 508, and carrier 510. The process 500 may incorporate some or all of the components and operations addressed above with respect to systems, processes, and ledgers 100, 200, 300, and 400.

At the data ingestion stage 502, various types of data are received from various sources and are processed. For example, these types of data include: a purchase order 512 for purchase of the goods to be transported by the carrier, a carrier contract 514 establishing the terms between the purchaser and carrier, and transportation events 516 that occur during transport. Transportation events may include events such as detention or demurrage, inspection, damage to the goods, etc. As a further example, these events may include receiving and processing Digital Container Shipping Associate (DCSA) data and standards relating to container shipping.

At the data transformation stage 504, the data are transformed into a usable form and an invoice is generated. For instance, this data transformation may involve: setting up carrier lane rates 518; retrieving origin, destination, and/or container codes/types/sizes 520; selecting transportation events and/or DCSA events data 522; and setting up key invoice trigger dates (such as starting and ending milestones). These data are validated at data validation stage 524 and used, in part, to generate the invoice 526. Other date may also used in generating the invoice 526, including, for example, retrieved booking data 528, retrieved carrier rates 530, key invoice events 532, and additional rules 534. For example, the additional rules may involve calculating split container charges based on the purchase order 512. At block 536, the purchase order 512 and the carrier contract 514 are saved to the distributed ledger platform 506. At block 538, the invoice data are added to and integrated into the distributed ledger platform 506.

The distributed ledger platform 506 includes, at least, a carrier node 540 and a purchaser node 542. The carrier invoice (a public version 544 and a private version 546) may be recorded at the carrier node 540. The purchase order 512 and the carrier contract 514 may be added to the purchaser node 542. In addition, certain data may be replicated from the carrier node 540 to the purchaser node 542, such as, for example, a private version of the carrier invoice 546. Further, a private version of a supplier's invoice 547 may also be recorded at the purchaser node 542. The carrier may read and write data to the distributed ledger platform 506 via an application API server 548.

Downstream consumers 508 (such as the carrier 550 and internal users of the purchaser) can consider the invoice, including adjustments, and make a decision whether to validate 552. The carrier 550 may propose revision(s) 554 to the invoice via carrier user interface 556. Internal users may review and/or reject the invoice via purchaser user interface 558. At block 560, both the carrier and purchaser (and any other required parties) verify and agree to the invoice (and/or any proposed changes). At block 562, the invoice (or revised invoice) is approved and is added to the distributed ledger platform 506.

FIG. 6 shows a process 600 for generating adjustments to an invoice involving a purchaser of goods and a carrier of the goods and a distributed ledger. It is generally contemplated that, during the shipment/transport of the goods, the shipment will experience transportation events that may require adjustments to be made to the invoice. The process 600 may incorporate some or all of the components and operations addressed above with respect to systems, processes, and ledgers 100, 200, 300, 400, and 500.

At block 602, contents of a contract of a purchaser for transport of goods by a carrier are accessed. The contract involves at least one container used to transport the goods that are the subject of the contract with the contract including at least one transportation charge relating to transport of the goods and a price for transport of the goods. For example, the transportation charges may include actual and possible charges, such as relating to detention, demurrage, inspection, base rates, etc. Further, for example, the price may reflect an anticipated face invoice amount and/or a base rate multiplied by an anticipated duration of the transport.

At block 604, shipment events data are received regarding transport of the goods by the carrier, and the shipment events data results in a change in a transportation charge or resulting in an additional transportation charge. For example, the change or additional transportation charges may relate to detention or demurrage of the goods beyond an allotted number of free days for the containers. Additionally, for example, these transportations may relate to damage to the goods, inspection, insurance, etc.

At block 606, an adjustment to the price/invoice amount is calculated based on the shipment events data. So, for example, an adjustment may be calculated based on detention or demurrage charges. Optionally, at block 608, an additional adjustment may be calculated based on the volume of the purchaser's goods. For instance, the goods may be included with other goods in a single container, and the additional adjustment may be made pro rata. Alternatively, the goods may be included in multiple containers and the additional adjustment may be calculated based on that volume.

At block 610, an invoice is generated for transport of the goods with the invoice including the adjusted calculation to the price. At block 612, approval is received from the purchaser and the carrier to adjustments shown in the invoice. This approval may be explicit, or it may be implicit based on the absence of an objection. At block 614, the invoice is added to the supply chain distributed ledger. In this form, the supply chain distributed ledger includes multiple nodes with at least one node corresponding to the purchaser and at least one node corresponding to the carrier and with the invoice being accessible on the supply chain distributed ledger to the purchaser and to the carrier. The approval may occur prior to or after recording of the invoice to the distributed ledger.

FIG. 7 shows a process 700 for controlled data sharing in the context of a distributed ledger. In one form, it is contemplated that this controlled data sharing occurs between a purchaser of goods, a carrier for transport of the goods, and a supplier of the goods. The process 700 may incorporate some or all of the components and operations addressed above with respect to systems, processes, and ledgers 100, 200, 300, 400, 500, and 600.

At block 702, a first node of a supply chain distributed ledger communicates via the network interface with a second node and a third node of a supply chain distributed ledger. The nodes correspond to a first entity, a second entity, and a third entity in the supply chain. In one form, the first entity corresponds to the purchaser, the second entity corresponds to the carrier, and the third entity corresponds to the supplier.

At block 704, a hash of a public version of a contract between the first entity and the second entity is stored at the first node. In one form, the contract is for the transport of the purchaser's goods by the carrier. At block 706, the hash of the public version of the contract is replicated to the supply chain distributed ledger with the public version of the contract being accessible to all of the entities. In one form, this public version is generally shared between a purchaser, a carrier, and a supplier. At block 708, private version of the contract is shared between the first and second nodes with the private version of the contract being shared peer-to-peer between, and accessible by, only the first and second entities. In one form, this private version is only shared between the purchaser and the carrier.

At block 710, a hash of a public version of a purchase order between the first entity and the third entity is stored at the first node. In one form, the purchase is for the purchase of goods by a purchaser from a supplier. At block 712, the hash of the public version of the purchase order is replicated to the supply chain distributed ledger with the public version of the contract being accessible to all of the entities. In one form, this public version is generally shared between a purchaser, a carrier, and a supplier. At block 714, a private version of the purchase order is shared between the first and third nodes with the private version of the contract being shared peer-to-peer, and accessible by, only the first and third entities. In one form, this private version is only shared between the purchaser and the carrier.

The process 700 may also include optional steps. At block 716, the first node of the supply chain distributed ledger receives via the network interface a carrier invoice from the second node with the carrier invoice being shared peer-to-peer between, and accessible by, only the first and second entities. In one form, only a purchaser and a carrier have access to the carrier invoice. At block 718, the first node of the supply chain distributed ledger receives via the network interface a supplier invoice from the third node with the supplier invoice being shared peer-to-peer between, and accessible by, only the first and third entities. In one form, only a purchaser and a supplier have access to the supplier invoice. At block 720, product shipment data is shared from the supplier invoice of the third entity with the second entity to generate the carrier invoice. In one form, for example, this product shipment data might relate to damage to the goods where a determination is to be made whether the damage occurred prior to or during shipment.

Descriptions of some embodiments of blockchain technology are provided with reference to FIG. 8-13 herein. In some embodiments of the invention described above, blockchain technology may be utilized to record supply chain events and supply information for product certificate management. One or more of the systems associated with supply chain entities described herein may comprise a node in a distributed blockchain system storing a copy of the blockchain record. Updates to the blockchain may comprise supply chain events such as transfer of items from one supply chain entity to another and/or the processing of a product from one form to another (e.g., cases of tomato to salad kit) and one or more nodes on the system may be configured to incorporate one or more updates into blocks to add to the distributed database.

Distributed databases and shared ledger databases generally refer to databases based on peer-to-peer record-keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g., proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin. pdf), the entirety of which is incorporated herein by reference.

Figures 8, 9:
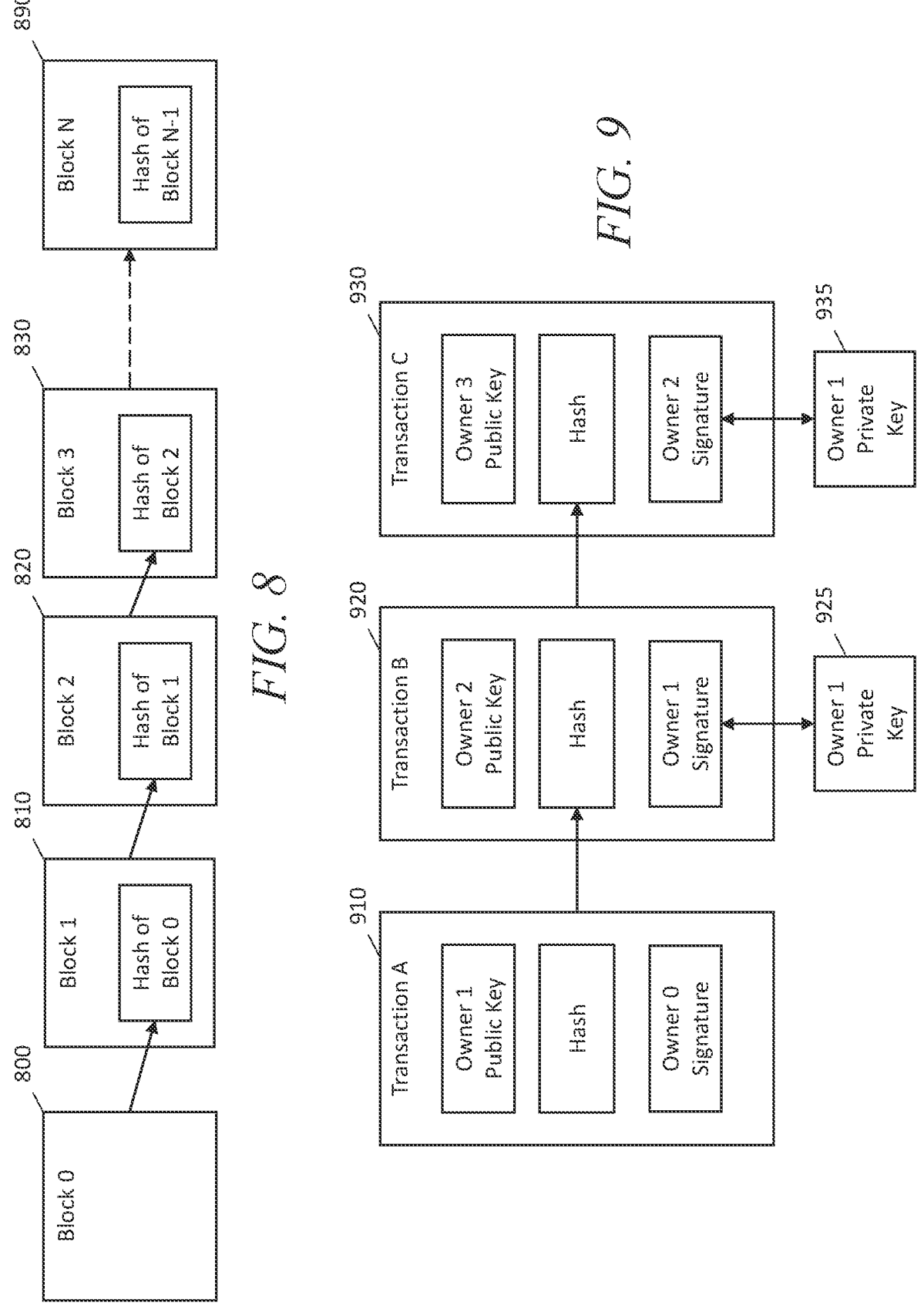
FIG. 8 comprises an illustration of blocks of a distributed ledger as configured in accordance with some embodiments.
FIG. 9 comprises an illustration of transaction records configured in accordance with some embodiments.

Now referring to FIG. 8, an illustration of a blockchain according to some embodiments is shown. In some embodiments, a blockchain comprises a hash chain or a hash tree in which each block added in the chain contains a hash of the previous block. In FIG. 8, block 0 800 represents a genesis block of the chain. Block 1 810 contains a hash of block 0 800, block 2 820 contains a hash of block 1 810, block 3 830 contains a hash of block 2 820, and so forth. Continuing down the chain, block N 890 contains a hash of block N–1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g., proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners' are nodes that compete to provide proof-of-work to form a new block, and the first successful miner of a new block earns Bitcoin currency in return.

Now referring to FIG. 9, an illustration of blockchain-based transactions according to some embodiments is shown. In some embodiments, the blockchain illustrated in FIG. 9 comprises a hash chain protected by private/public key encryption. Transaction A 910 represents a transaction recorded in a block of a blockchain showing that owner 1 (recipient) obtained an asset from owner 0 (sender). Transaction A 910 contains owner's 1 public key and owner 0's signature for the transaction and a hash of a previous block. When owner 1 transfers the asset to owner 2, a block containing transaction B 920 is formed. The record of transaction B 920 comprises the public key of owner 2 (recipient), a hash of the previous block, and owner 1's signature for the transaction that is signed with the owner 1's private key 925 and verified using owner 1's public key in transaction A 910. When owner 2 transfers the asset to owner 3, a block containing transaction C 930 is formed. The record of transaction C 930 comprises the public key of owner 3 (recipient), a hash of the previous block, and owner 2's signature for the transaction that is signed by owner 2's private key 635 and verified using owner 2's public key from transaction B 920. In some embodiments, when each transaction record is created, the system may check previous transaction records and the current owner's private and public key signature to determine whether the transaction is valid. In some embodiments, transactions may be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double-spending the asset. The transactions in FIG. 9 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 10:
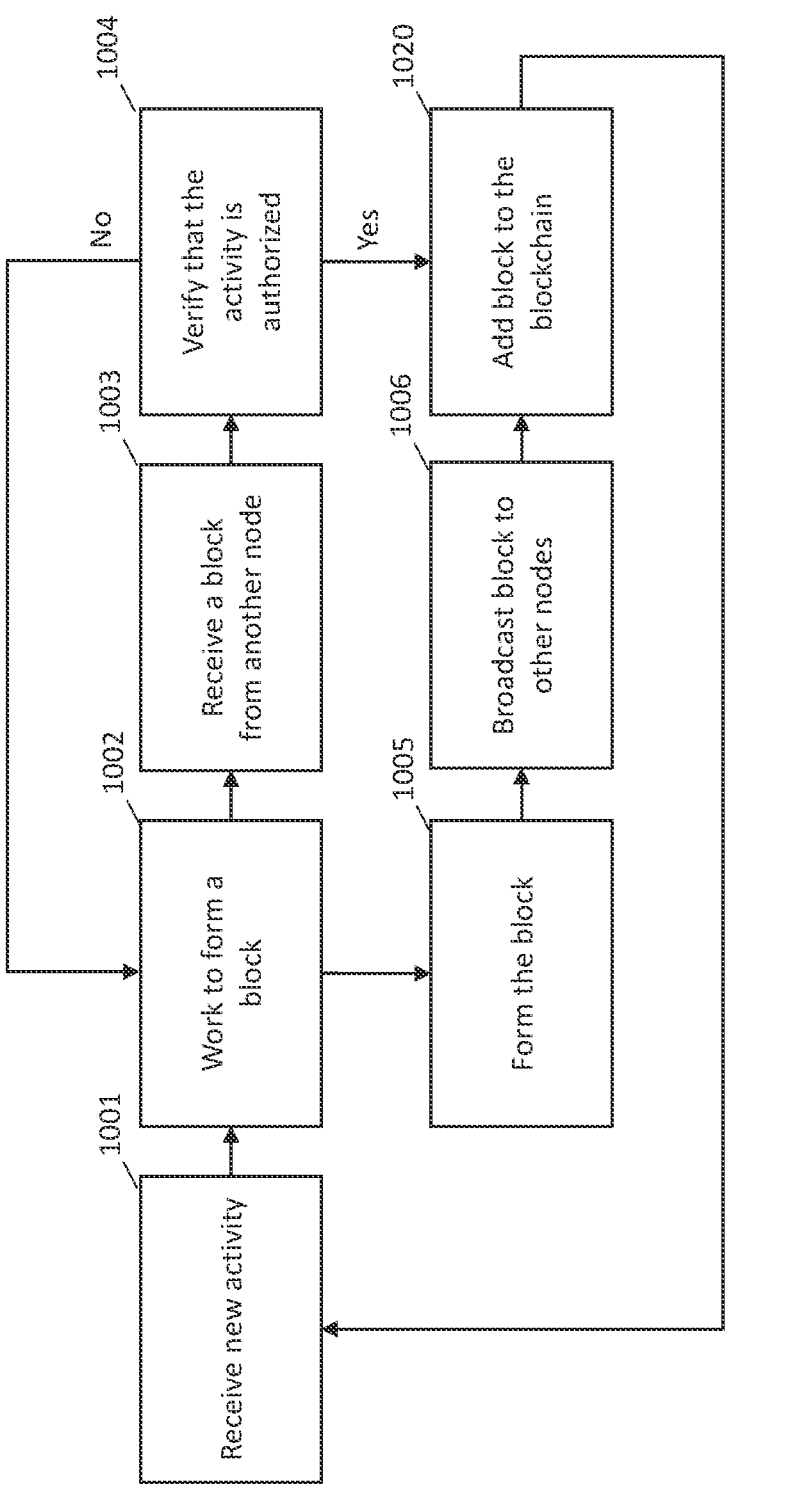
FIG. 10 comprises a flow diagram in accordance with some embodiments.

Now referring to FIG. 10, a flow diagram according to some embodiments is shown. In some embodiments, the steps shown in FIG. 10 may be performed by a processor-based device, such as a computer system, a server, a distributed server, a timestamp server, a blockchain node, and the like. In some embodiments, the steps in FIG. 10 may be performed by one or more of the nodes in a system using blockchain for record-keeping.

In step 1001, a node receives a new activity. The new activity may comprise an update to the record being kept in the form of a blockchain. In some embodiments, for block-chain-supported digital or physical asset record-keeping, the new activity may comprise an asset transaction. In some embodiments, the new activity may be broadcasted to a plurality of nodes on the network prior to step 1001. In step 1002, the node works to form a block to update the block-chain. In some embodiments, a block may comprise a plurality of activities or updates and a hash of one or more previous blocks in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g., proof of work, proof of stake, etc.) which requires the node to solve a difficult mathematical problem to form a nonce in order to form a block. In some embodiments, the node may be configured to verify that the activity is authorized prior to working to form the block. In some embodiments, whether the activity is authorized may be determined based on records in the earlier blocks of the blockchain itself.

After step 1002, if the node successfully forms a block in step 1005 prior to receiving a block from another node, the node broadcasts the block to other nodes over the network in step 1006. In some embodiments, in a system with incentive features, the first node to form a block may be permitted to add incentive payment to itself in the newly formed block. In step 1020, the node then adds the block to its copy of the blockchain. In the event that the node receives a block formed by another node in step 1003 prior to being able to form the block, the node works to verify that the activity recorded in the received block is authorized in step 1004. In some embodiments, the node may further check the new block against system consensus rules for blocks and activities to verify whether the block is properly formed. If the new block is not authorized, the node may reject the block update and return to step 1002 to continue to work to form the block. If the new block is verified by the node, the node may express its approval by adding the received block to its copy of the blockchain in step 1020. After a block is added, the node then returns to step 1001 to form the next block using the newly extended blockchain for the hash in the new block.

In some embodiments, in the event one or more blocks having the same block number is received after step 1020, the node may verify the later arriving blocks and temporarily store these blocks if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 1001.

Figure 11:
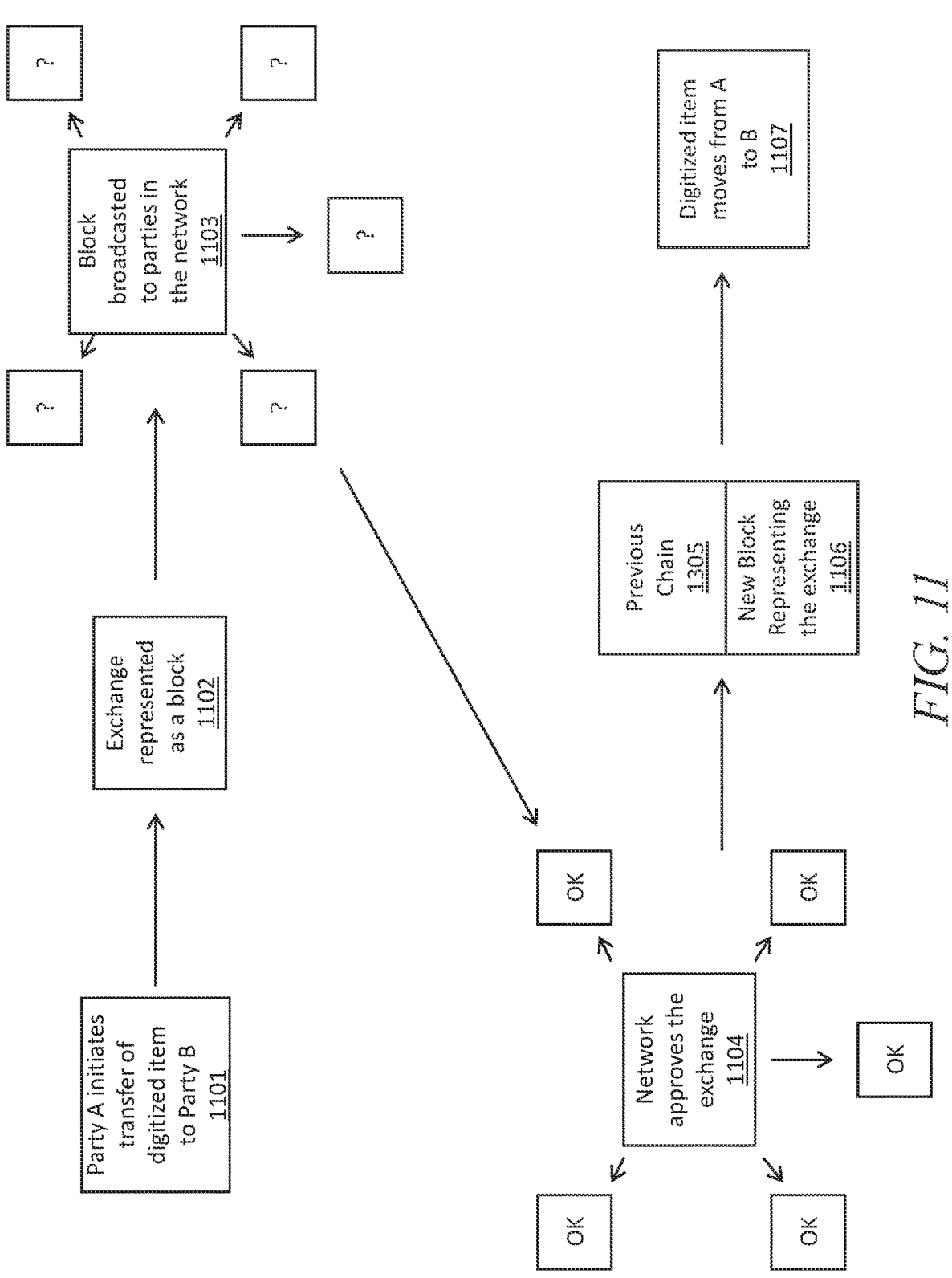
FIG. 11 comprises a process diagram as configured in accordance with some embodiments.

Now referring to FIG. 11, a process diagram of a block-chain update according to some implementations is shown. In step 1101, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 1102, the exchange initiated in step 1101 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide proof of work for a block may earn a Bitcoin. In some embodiments, a block may comprise one or more transactions between different parties that are broadcasted to the nodes. In step 1103, the block is broadcasted to parties in the network. In step 1104, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g., party A is in possession of the asset he/she s seeks to transfer). In some embodiments, a block may be approved with consensus of the nodes in the network. After a block is approved, the new block 1106 representing the exchange is added to the existing chain 1105 comprising blocks that chronologically precede the new block 1106. The new block 1106 may contain the transaction(s) and a hash of one or more blocks in the existing chain 1105. In some embodiments, each node may then update their copy of the blockchain with the new block and continue to work on extending the chain with additional transactions. In step 1107, when the chain is updated with the new block, the digitized item is moved from party A to party B.

Figure 12:
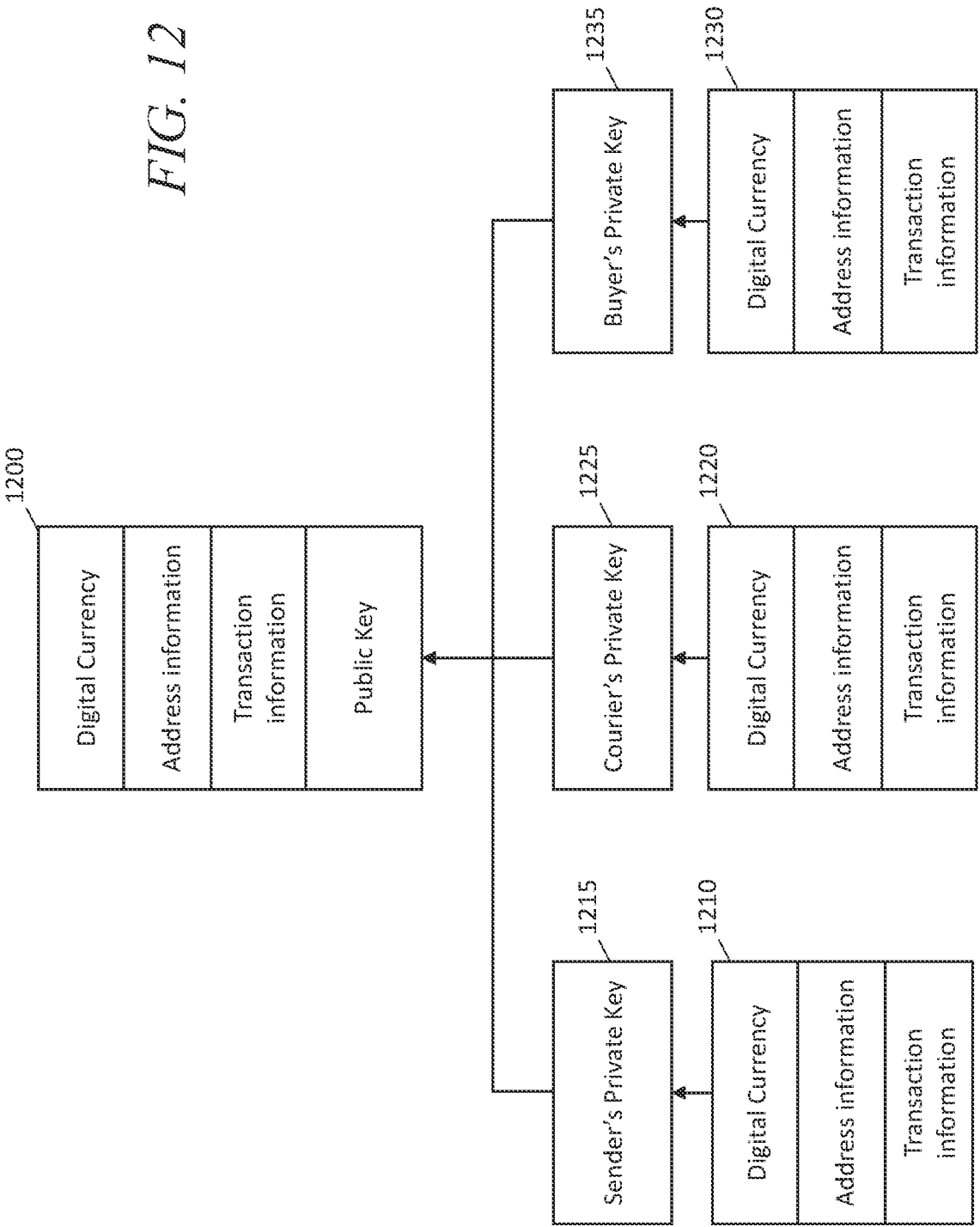
FIG. 12 comprises an illustration of a delivery record configured in accordance with some embodiments.

Now referring to FIG. 12, a diagram of a blockchain according to some embodiments in shown. FIG. 12 comprises an example of an implementation of a blockchain system for delivery service record keeping. The delivery record 1200 comprises digital currency information, address information, transaction information, and a public key associated with one or more of a sender, a courier, and a buyer. In some embodiments, nodes associated with the sender, the courier, and the buyer may each store a copy of the delivery records 1210, 1220, and 1230 respectively. In some embodiments, the delivery record 1200 comprises a public key that allows the sender, the courier, and/or the buyer to view and/or update the delivery record 1200 using their private keys 1215, 1225, and 1235 respectively. For example, when a package is transferred from a sender to the courier, the sender may use the sender's private key 1215 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 1225 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 12, the delivery record may be updated by one or more of the sender, courier, and the buyer to form a record of the transaction without a trusted third party while preventing unauthorized modifications to the record. In some embodiments, the blockchain-based transactions may further function to include transfers of digital currency with the completion of the transfer of physical assets. With the distributed database and peer-to-peer verification of a blockchain system, the sender, the courier, and the buyer can each have confidence in the authenticity and accuracy of the delivery record stored in the form of a blockchain.

Figure 13:
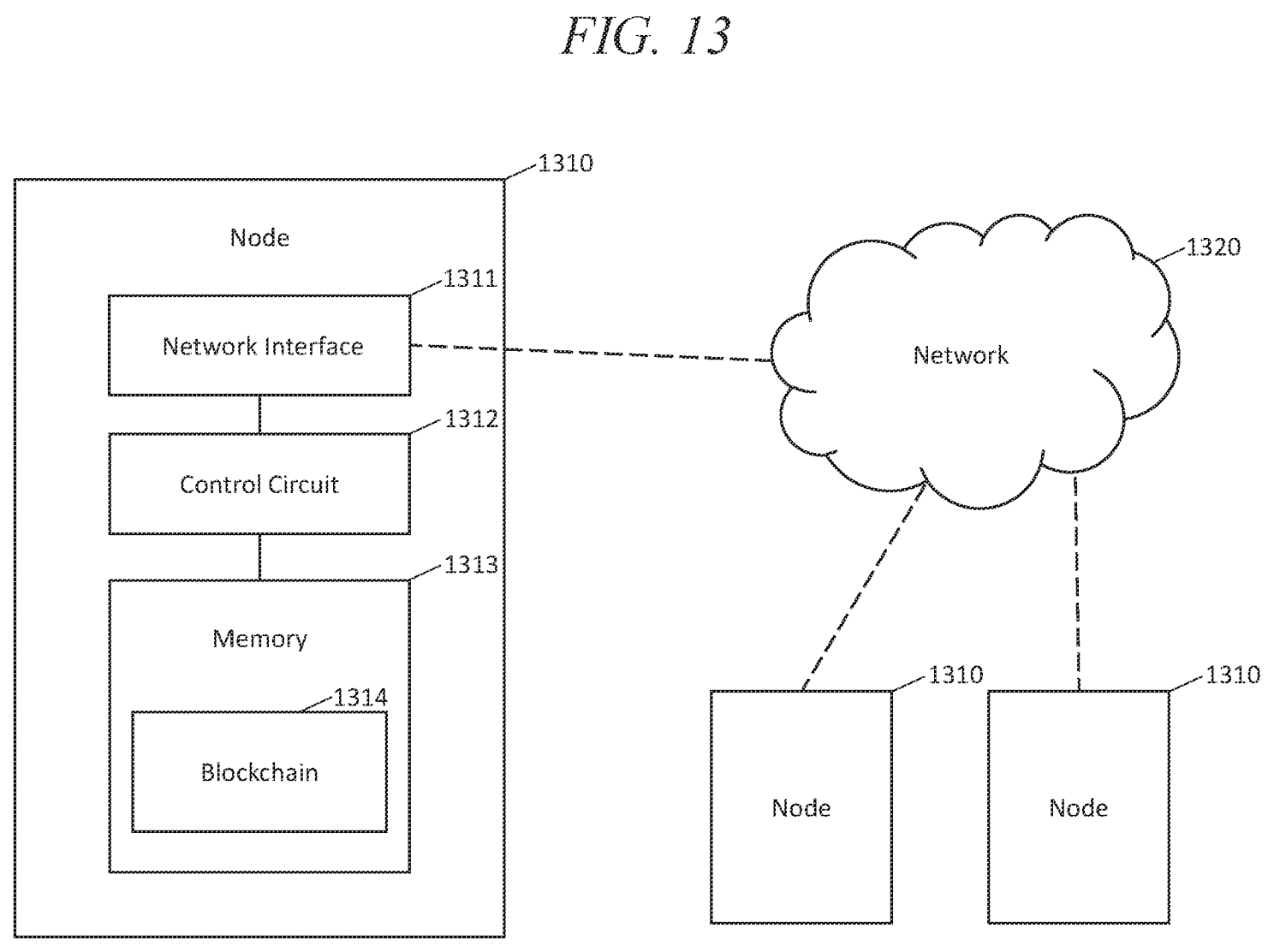

Now referring to FIG. 13, a system according to some embodiments is shown. A distributed blockchain system comprises a plurality of nodes 1310 communicating over a network 1320. In some embodiments, the nodes 1310 may comprise a distributed blockchain server and/or a distributed timestamp server. In some embodiments, one or more nodes 1310 may comprise or be similar to a "miner" device on the Bitcoin network. Each node 1310 in the system comprises a network interface 1311, a control circuit 1312, and a memory 1313.

The control circuit 1312 may comprise a processor, a microprocessor, and the like and may be configured to execute computer readable instructions stored on a computer readable storage memory 1313. The computer readable storage memory may comprise volatile and/or non-volatile memory and have stored upon it a set of computer readable instructions which, when executed by the control circuit 1312, causes the node 1310 to update the blockchain 1314 stored in the memory 1313 based on communications with other nodes 1310 over the network 1320. In some embodiments, the control circuit 1312 may further be configured to extend the blockchain 1314 by processing updates to form new blocks for the blockchain 1314. Generally, each node may store a version of the blockchain 1314, and together, may form a distributed database. In some embodiments, each node 1310 may be configured to perform one or more steps described herein.

The network interface 1311 may comprise one or more network devices configured to allow the control circuit to receive and transmit information via the network 1320. In some embodiments, the network interface 1311 may comprise one or more of a network adapter, a modem, a router, a data port, a transceiver, and the like. The network 1320 may comprise a communication network configured to allow one or more nodes 1310 to exchange data. In some embodiments, the network 1320 may comprise one or more of the Internet, a local area network, a private network, a virtual private network, a home network, a wired network, a wireless network, and the like. In some embodiments, the system does not include a central server and/or a trusted third-party system. Each node in the system may enter and leave the network at any time.

With the system and processes shown in, once a block is formed, the block cannot be changed without redoing the work to satisfy census rules thereby securing the block from tampering. A malicious attacker would need to provide a proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain-backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one or more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain-based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain-based system allows content use, content exchange, and the use of the content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that use one or more of cryptography, private/public key encryption, proof standard, distributed timestamp server, and inventive schemes to regulate how new blocks may be added to the chain. In some embodiments, blockchain may refer to the technology that underlies the Bitcoin system, a "side-chain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for controlled data sharing comprising:
a network interface; and
a control circuit coupled to the network interface, the control circuit to:
communicate, as a first node of a supply chain distributed ledger and via the network interface, with a second node and a third node of the supply chain distributed ledger, the nodes corresponding to a first entity, a second entity, and a third entity in a supply chain;
create and store a cryptographic hash of a public version of a first set of data involving the first entity and the second entity at the first node;
replicate the cryptographic hash of the public version of the first set of data to the supply chain distributed ledger, the cryptographic hash of the public version of the first set of data being accessible to all of the three entities;
share a cryptographic hash of a private version of the first set of data between the first and second nodes, the cryptographic hash of the private version of the first set of data being shared peer-to-peer between, and accessible by, only the first and second entities;
create and store a cryptographic hash of a public version of a second set of data involving the first entity and the third entity at the first node;
replicate the cryptographic hash of the public version of the second set of data to the supply chain distributed ledger, the cryptographic hash of the public version of the second set of data being accessible to all of the three entities;
share a cryptographic hash of a private version of the second set of data between the first and third nodes, the cryptographic hash of the private version of the second set of data being shared peer-to-peer, and accessible by, only the first and third entities;
receive an update from a scanning device, the update automatically triggered and transmitted based on scans, by the scanning device, of one or more images of damaged products owned by the first entity and being transported by the second entity;
store, at the first node, the one or more images of the damaged products; and
share, with the second node, the one or more images of the damaged products.

2. The system of claim 1, wherein the first entity is a purchaser of products, the second entity is a carrier of the products, and third entity is a supplier of the products.

3. The system of claim 1, wherein the first set of data comprises a contract, the public version of the contract including information indicating existence of the contract but not actual contract terms.

4. The system of claim 1, wherein the first set of data comprises a contract, the public version of the contract not including at least one of origin, destination, container type, carrier identification data, or carrier rate data.

5. The system of claim 1, wherein the second set of data comprises a purchase order, the public version of the purchase order including at least one of product identifier, product name, and product quantity.

6. The system of claim 1, wherein the second set of data comprises a purchase order, the public version of the purchase order not including item price data.

7. The system of claim 1, wherein the control circuit to:
receive, as the first node of the supply chain distributed ledger and via the network interface, a carrier invoice from the second node, the carrier invoice being shared peer-to-peer between, and accessible by, only the first and second entities.

8. The system of claim 1, wherein the control circuit to:
receive, as the first node of the supply chain distributed ledger and via the network interface, a supplier invoice from the third node, the supplier invoice being shared peer-to-peer between, and accessible by, only the first and third entities.

9. The system of claim 1, wherein the control circuit to:
share product shipment data from a supplier invoice of the third entity with the second entity to generate a carrier invoice.

10. The system of claim 1, wherein the control circuit to:
maintain data integrity and share a third set of data with a fourth entity being a regulatory agency, the third set of data being shared peer-to-peer, and accessible by, only the first and fourth entities.

11. The system of claim 1, wherein:
when a plurality of blocks having a same block identifier as each other is received at the first node, the first node verifies the plurality of blocks and temporarily stores the plurality of blocks if they pass verification; and
the first node uses a subsequent block to determine which of the plurality of blocks is a correct or consensus block.

12. The system of claim 1, wherein a longest chain of blocks in the supply chain distributed ledger is retrieved following the first node going offline, each new block added since the first node has been offline is verified, and a local copy of the supply chain distributed ledger is updated.

13. A method for controlled data sharing comprising:
communicating, as a first node of a supply chain distributed ledger and via a network interface, with a second node and a third node of the supply chain distributed ledger, the nodes corresponding to a first entity, a second entity, and a third entity in a supply chain;
creating and storing, by a control circuit, a cryptographic hash of a public version of a first set of data involving the first entity and the second entity at the first node;
replicating, by the control circuit, the cryptographic hash of the public version of the first set of data to the supply chain distributed ledger, the cryptographic hash of the public version of the first set of data being accessible to all of the three entities;

sharing, by the control circuit, a cryptographic hash of a private version of the first set of data between the first and second nodes, the cryptographic hash of the private version of the first set of data being shared peer-to-peer between, and accessible by, only the first and second entities;

creating and storing, by the control circuit, a cryptographic hash of a public version of a second set of data involving the first entity and the third entity at the first node;

replicating, by the control circuit, the cryptographic hash of the public version of the second set of data to the supply chain distributed ledger, the cryptographic hash of the public version of the second set of data being accessible to all of the three entities;

sharing, by the control circuit, a cryptographic hash of a private version of the second set of data between the first and third nodes, the cryptographic hash of the private version of the second set of data being shared peer-to-peer, and accessible by, only the first and third entities;

receiving, by the control circuit, an update from a scanning device, the update automatically triggered and transmitted based on scans, by the scanning device, of one or more images of damaged products owned by the first entity and being transported by the second entity;

storing, at the first node, the one or more images of the damaged products; and sharing, with the second node, the one or more images of the damaged products.

14. The method of claim 13, wherein the first entity is a purchaser of products, the second entity is a carrier of the products, and third entity is a supplier of the products.

15. The method of claim 13, wherein the first set of data comprises a contract, the public version of the contract including information indicating existence of the contract but not actual contract terms.

16. The method of claim 13, wherein the first set of data comprises a contract, the public version of the contract not including at least one of origin, destination, container type, carrier identification data, or carrier rate data.

17. The method of claim 13, wherein the second set of data comprises a purchase order, the public version of the purchase order including at least one of product identifier, product name, and product quantity.

18. The method of claim 13, wherein the second set of data comprises a purchase order, the public version of the purchase order not including item price data.

19. The method of claim 13, further comprising, by the control circuit:

receiving, as the first node of the supply chain distributed ledger and via the network interface, a carrier invoice from the second node, the carrier invoice being shared peer-to-peer between, and accessible by, only the first and second entities.

20. The method of claim 13, further comprising, by the control circuit:

receiving, as the first node of the supply chain distributed ledger and via the network interface, a supplier invoice from the third node, the supplier invoice being shared peer-to-peer between, and accessible by, only the first and third entities.

\* \* \* \* \*